United States Patent [19]
Ristuccia

[11] 3,793,559
[45] Feb. 19, 1974

[54] TRANSFORMER APPARATUS AND MONITORING SYSTEM

[75] Inventor: Donald J. Ristuccia, Athens, Ga.

[73] Assignee: Westinghouse Electric Corporation, Pittsburgh, Pa.

[22] Filed: Aug. 10, 1972

[21] Appl. No.: 279,565

[52] U.S. Cl. ........... 317/14 C, 317/14 H, 317/14 F, 317/27 R, 317/40 R
[51] Int. Cl. ............................................ H02h 7/04
[58] Field of Search .... 317/14 R, 14 C, 14 H, 14 F, 317/15, 27 R, 14 A, 13 B, 40 R, 40 A

[56] References Cited
UNITED STATES PATENTS

| | | | |
|---|---|---|---|
| 3,223,889 | 12/1965 | Schweitzer | 317/27 R |
| 3,423,634 | 1/1969 | Wagner | 317/14 R |
| 3,398,323 | 8/1968 | Anderson | 317/40 R |
| 2,805,367 | 9/1967 | Burski | 317/14 H |

Primary Examiner—J. D. Miller
Assistant Examiner—Harvey Fendelman
Attorney, Agent, or Firm—J. R. Hanway

[57] ABSTRACT

A remote control system for transformers which monitors the critical parameters of transformer operation. Current transformers are coupled to currents flowing in primary and secondary windings of the transformer. A switch is connected in the circuit of the primary winding and a temperature sensing means is positioned within the structure of the core and coil assembly of the transformer. Signals from the current transformers and the temperature sensing means are transmitted to a remote monitor. The monitor compares the transformer secondary current and the temperature with reference values and compares the primary and secondary current and turns ratios for equivalence. When the comparisons are not acceptable according to a predetermined program, a disconnect signal is originated by the monitor to open the switch and deenergize the transformer.

10 Claims, 3 Drawing Figures

3,793,559

3,793,559

TRANSFORMER APPARATUS AND MONITORING SYSTEM

BACKGROUND OF THE INVENTION

1. Field of the Invention

This invention relates, in general, to electrical inductive apparatus, and more specifically, to remote monitoring and controlling of transformers.

2. Description of the Prior Art

Distribution transformers often have protective devices associated therewith to protect the transformer and distribution lines from excessive currents. Circuit breakers, current-limiting fuses, and protective links are used separately or in various combinations to interrupt excessive currents in the primary and/or secondary windings of the transformer.

SUMMARY OF THE INVENTION

Conventional protective devices are activated when the current flowing therethrough exceeds a predetermined value, such as an overload value above the normal rated current. Since conventional protective devices have a fixed predetermined value, the maximum amount of current which may flow through the protective devices cannot be changed easily. Thus, the amount of overload current which the transformer will carry is fixed.

It is desirable in many applications to change the overload capacity of a distribution transformer. In some applications, reducing the transformer life somewhat by sustaining a moderate overload is better than interrupting the load current and causing a power outage. In other applications, the decision to interrupt load current may depend on the condition of other transformers in the distribution system, the length and magnitude of the overload, the number and type of facilities served by the transformer, as well as numerous other factors.

Therefore, it is desirable, and it is an object of this invention, to provide means for remotely monitoring and controlling conditions of distribution transformers. With such means, controlling the transformers can be governed by conditions occurring at the time control is desired, and not during manufacturing of the transformers. It is also desirable, and it is a further object of this invention, to provide means for remotely monitoring and controlling conditions of distribution transformers with a minimum of protective and switching devices.

SUMMARY OF THE INVENTION

There is disclosed herein new, useful, and efficient means for remotely monitoring and controlling transformers. Current transformers are coupled to currents flowing in primary and secondary windings of the transformer. A switching means is connected in the circuit of the primary winding and may be opened by a remotely originated signal to deenergize the transformer. A temperature sensing means is positioned within the structure of the core and coil assembly of the transformer to measure the temperature therein. Information signals from the current transformers and the temperature sensing means are transmitted to a remote monitor which processes the signals and takes appropriate steps according to a predetermined program. The monitor compares the transformer secondary current with a reference value, the primary and secondary current and turns ratios for equivalence, and the temperature of the core and coil assembly with a reference value. The predetermined program may require activation of a disconnect signal to deenergize the transformer when it is undesirable to maintain the transformer in service.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
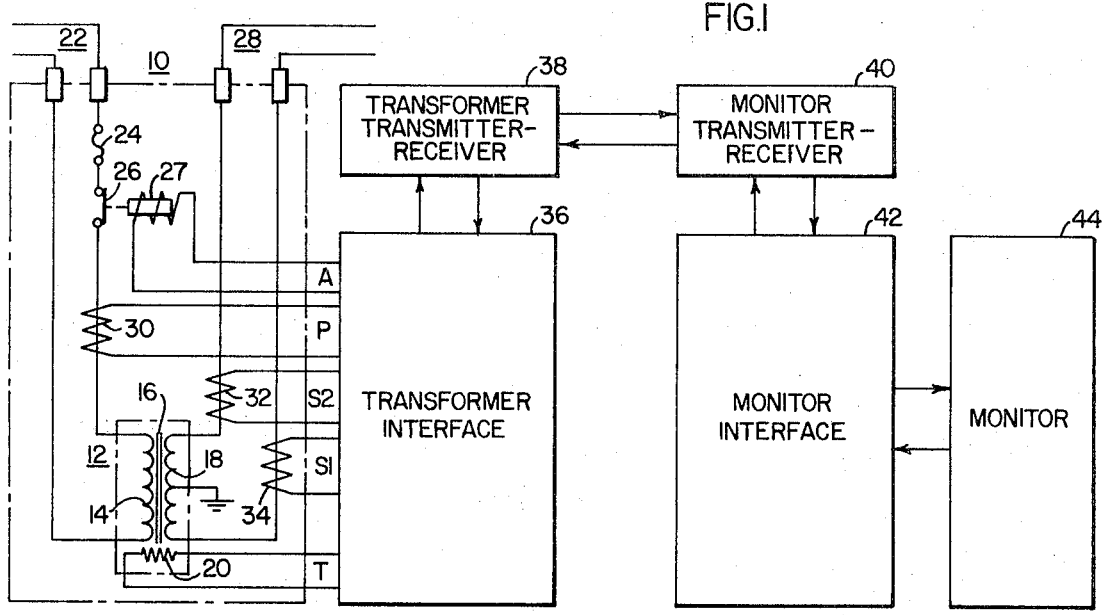
FIG. 1 is a schematic diagram of a transformer and its associated monitoring apparatus constructed according to this invention.

Throughout the following description, similar reference characters refer to similar elements in all the figures of the drawing.

Referring now to the drawing, and FIG. 1 in particular there is shown a schematic diagram of a transformer 10 and its associated monitoring apparatus. The transformer 10 includes a core and coil assembly 12 which is disposed within a transformer enclosure. The core and coil assembly 12 includes a primary winding 14, a magnetic core 16, and a secondary winding 18. A temperature sensing device, such as the thermocouple 20, is contained within the structure of the core and coil assembly 12 and is responsive to the temperature of the core and coil assembly 12.

The primary winding 14 is energized by voltage from a primary transmission line 22. A protective device, such as the protective link 24, and a switching means 26 are connected in series with the primary winding 14 to permit the interruption of current flowing therethrough. The secondary winding 18 is connected to a secondary transmission line 28. Current transformers 30, 32 and 34 are coupled to the primary and secondary winding leads as shown in FIG. 1 to monitor the currents therein.

The switching means 26 may be a vacuum switch or other suitable device capable of being activated by a signal responsive means, such as the solenoid 27. The windings 14 and 18 may be encapsulated with an insulating material to form an integral structure around the magnetic core 16. The temperature sensing device may be embedded in the insulating material of the core and coil structure.

A transformer interface 36 transfers the monitored information from the transformer 10 to a transformer transmitter-receiver 38. Temperature information is conveyed by channel T. Primary current information is conveyed by channel P. Secondary current information is conveyed by channels S1 and S2. Channel A conveys control signals to the solenoid 27 for opening and closing the switching means 26. The control and information signals are transferred through a monitor transmitter-receiver 40 to a monitor interface 42 which properly processes the signals for application to a monitor 44.

Complete control of the critical transformer variables can be achieved by the system and apparatus shown in FIG. 1. Secondary overload currents are monitored by the current transformer 32 and/or the current transformer 34. The major source of such overload currents is from abnormal conditions on the secondary transmission line 28. The primary overload currents are monitored by the current transformer 30. The major sources of primary overload currents are excessive secondary loading and/or fault conditions within the core and coil assembly 12.

Figure 2:
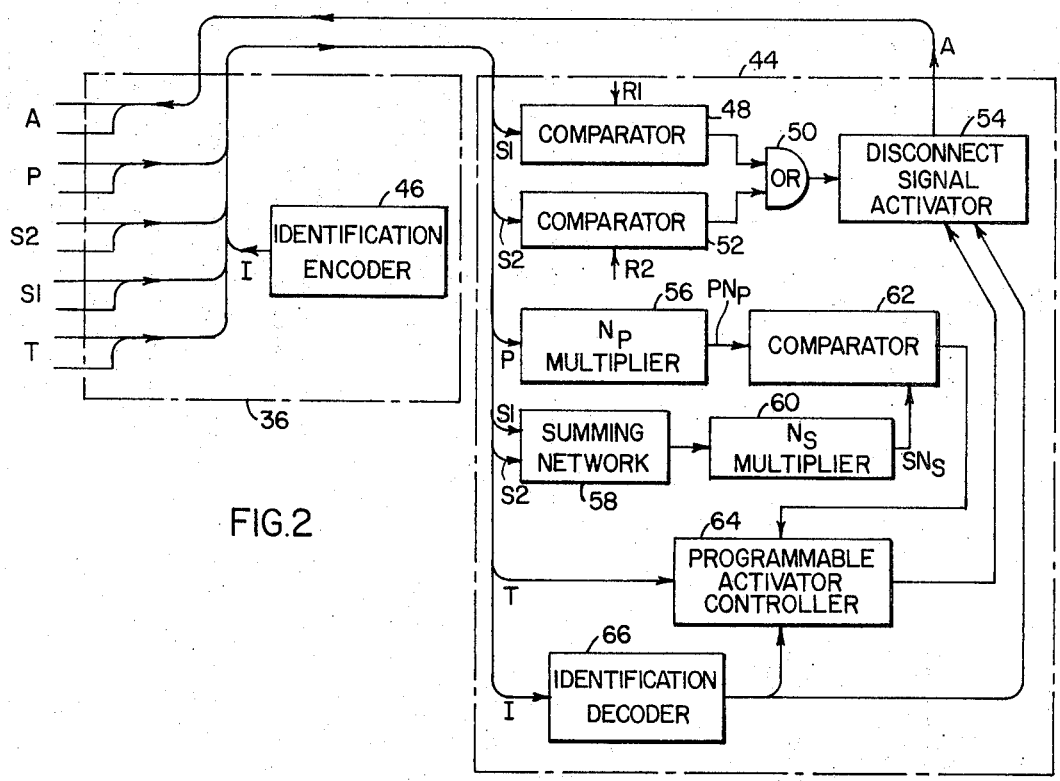
FIG. 2 is a block diagram illustrating an arrangement for processing information from a remote transformer according to a specific embodiment of this invention.

FIG. 2 illustrates in block form an arrangement for processing the sensed information signals according to a specific embodiment of this invention. The information signals corresponding to the winding currents and temperature are transferred from the interface 36, along with an identification signal I, by suitable means to the monitor 44. Each transformer has a separate identification encoder 46 which correlates the sensed information with that particular transformer.

The secondary current information signal S1 is applied to a comparator 48. The comparator 48 compares the signal S1 to a reference signal R1. When the signal S1 exceeds the reference signal R1, an output signal is applied to the OR logic stage 50. In a simialr manner, signal S2 is applied to the comparator 52. When signal S2 exceeds the reference signal R2, an output signal is applied to the OR logic stage 50. When the OR logic stage 50 receives an output signal from comparator 48 or comparator 52, a signal is transferred to a disconnect signal activator 54 which originates a disconnect signal A to open the switching means 26. Therefore, when the current in either side of the center tapped secondary winding 18 exceeds a predetermined value, such a value being determined by the reference signals R1 and R2, the transformer is de-energized. Preferably, the predetermined value of secondary current would be approximately equal to the short-circuit secondary current for the particular transformer.

The primary current information signal P is applied to a multiplier 56 which effectively multiplies the current signal P by the number of primary winding turns $N_p$ to give an output equal to $PN_p$. The secondary current information signals S1 and S2 are applied to a summing network 58 which adds the secondary current signals together and applies the result to a multiplier 60 which provides an output $SN_s$, where S is the sum of the secondary current signals and $N_s$ is the number of secondary winding turns.

The output signals from the multipliers 56 and 60 are applied to a comparator 62 which provides an output when the signals applied thereto are substantially unequal. The output from the comparator 62 is applied to a programmable activator controller 64. The temperature signal T is also applied to a controller 64. The identification signal I is applied to an identification decoder 66 which feeds signals to the controller 64 and to the activator 54 to identify the transformer from which the sensed information is derived. The controller 64 processes the termperature signal and the signal from the comparator 62 to determine whether a disconnect signal should be originated by the activator 54. The decision to originate a disconnect signal depends on the manner in which the controller 64 has been programmed.

The various components of the monitor 44 and the unique arrangement of the information signals applied thereto protect the monitored transformer from practically all of the destructive conditions which it could be subjected to. A short-circuit current in the secondary winding 18 activates the OR logic stage 50 and immediately activates a disconnect signal to open the switching means 26. Thus, a short-circuited secondary winding 18 is de-energized by the switching means 26 in the circuit of the primary winding 14. It is emphasized that this arrangement makes it unnecessary to provide a circuit breaker in the circuit of the secondary winding 18. A faulty condition within the core and coil assembly 12, such as shorted winding turns, is monitored by the comparator 62. When such a fault condition exists, the current-turns products for the primary and secondary windings will not be equal. In normal operation, the current-turns products are substantially equal in highly efficient distribution transformers. When an unsatisfactory condition is detected, the controller 64 is signalled accordingly and decides on the proper action to take depending on the other inputs to the controller 64, such as the temperature signal T, and the manner in which the controller 64 is programmed. Abnormally high currents in the circuit of the primary winding 14 resulting from a fault within the core and coil assembly 12 are observed by the comparator 62.

In case of a major fault within the transformer 10, the protective link 24 interrupts the circuit and de-energizes the transformer 10 immediately without consulting the remote monitor 44. It is within the contemplation of this invention that means other than the protective link 24 may be used, such as a magnetic or thermal tripping mechanism for the switching means 26 to de-energize the transformer 10 during a major fault primary current. A current-limiting fuse may also be used.

When a major primary or secondary fault does not exist, a moderate overload condition is generally destructive only when the temperature of the transformer components becomes excessively high. Thus, the temperature information signal T is processed by the controller 64 to determine if the transformer should be de-energized. The controller 64 also looks at the current-turns products comparison of the windings in determining what action to take. A substantially equal current-turns product with a high temperature signal T indicates a moderate overload. Unequal current-turns products indicate failure in one of the windings.

A plurality of transformers may be monitored by a common monitor. With the monitor 44 shown in FIG. 2, means for periodically scanning the information signal from each transformer may be used. When it is desirable to monitor a large number of transformers, the monitor arrangement shown in FIG. 3 provides means for detecting a faulty transformer condition immediately.

Figure 3:
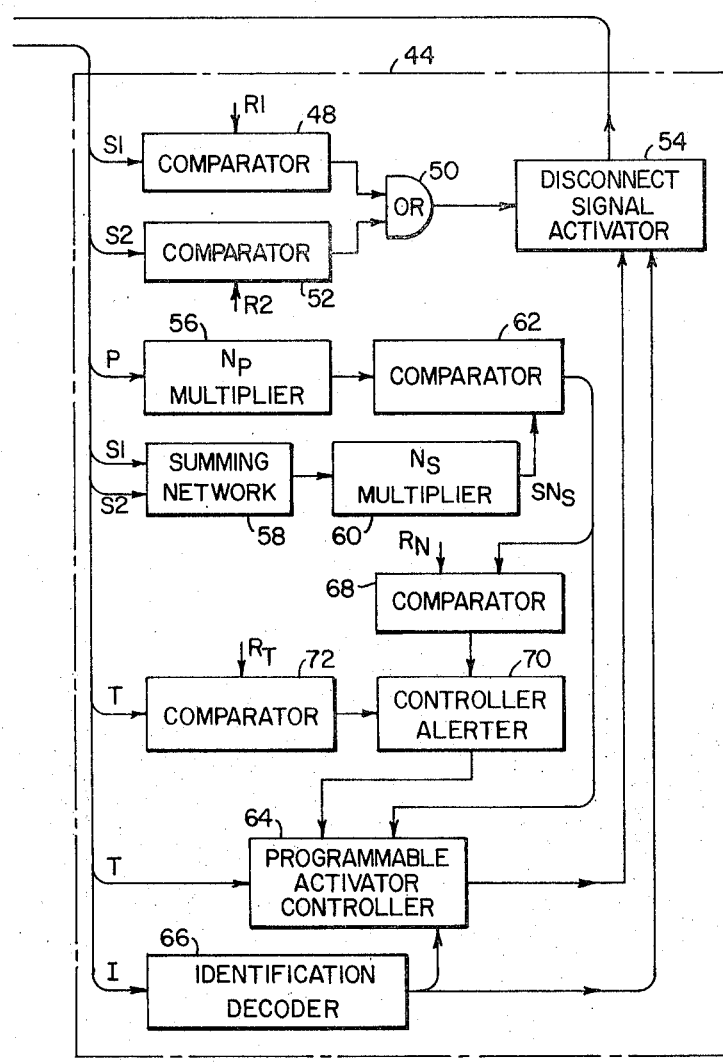
FIG. 3 is a block diagram illustrating an arrangement for processing information from a remote transformer according to another specific embodiment of this invention.

As shown in FIG. 3, a short-circuit secondary current will originate a disconnect signal without consulting the programmed activator controller 64. The output from the current-turns product comparator 62 is applied to the controller 64 and to a comparator 68. This output is compared with a reference signal $R_n$. When the output from the comparator 62 exceeds the reference input $R_n$, an output from the comparator 68 activates the controller alerter 70. When the controller alerter 70 is activated, controller 64 is alerted to monitor immediately the information signal from the transformer which activates the alerter 70. In a similar manner, the temperature information signal T is compared to a reference signal $R_t$ by the comparator 72.

The arrangement of FIG. 3 allows the monitor to respond immediately to significant information signals. The characteristics of the information signals which activate the alerter 70 are determined by the reference input signals $R_n$ and $R_t$. As with the embodiment shown in FIG. 2, monitor functions other than the controller 64, the decoder 66, and the activator 54 may be positioned at the transformer location.

The monitoring systems of the specific embodiments described herein efficiently monitor the important parameters of transformer operation. When the parameters exceed accepted values, the monitor responds by activating a disconnect signal to de-energize the transformer when major faults occur and when under constant overload conditions according to a predetermined program. Since numerous changes may be made in the above-described apparatus and systems, and different embodiments of the invention may be made without departing from the spirit thereof, it is intended that all of the matter contained in the foregoing description or shown in the accompanying drawings shall be interpreted as illustrative rather than limiting.

I claim as my invention:

1. Transformer apparatus for remote monitoring and controlling systems, comprising an enclosure, a magnetic core disposed within said enclosure, primary and secondary windings disposed in inductive relationship with said magnetic core, first current sensing means which detects the amount of current flowing through said primary winding, second current sensing means which detects the amount of current flowing through said secondary winding, temperature sensing means which detects temperature within the transformer enclosure, said temperature sensing means being connected for transmitting information indicative of the instant detected temperature to the outside of the enclosure, and switching means connected in series circuit relationship with said primary winding for opening and closing the primary winding circuit.

2. The transformer apparatus of claim 1 wherein the first current sensing means comprises a first current transformer connected in series circuit relationship with the primary winding, the second current sensing means comprises second and third current transformers connected in series circuit relationship with the secondary winding, and the temperature sensing means comprises a thermocouple located within the structure of the primary and secondary windings.

3. The transformer apparatus of claim 1 wherein the switching means comprises a vacuum switch which may be activated by signals originated from outside of the transformer enclosure.

4. The transformer apparatus of claim 1 including protective means which limits the flow of current through the primary winding to an amount which is below a predetermetned value.

5. The transformer apparatus of claim 4 wherein the protective means comprises a protective link.

6. The transformer apparatus of claim 4 wherein the protective means comprises activating means responsive to current flowing through a primary winding, said activating means opening the switching means when the flow of current through the primary winding equals a predetermined value.

7. Transformer apparatus for remote monitoring and controlling systems, comprising an enclosure, a primary winding having two leads, a magnetic core disposed within said enclosure, a secondary winding having two end leads and a tap lead, said windings being disposed in inductive relationship with said magnetic core, a first current transformer suitably disposed to sense the amount of current flowing through one of the leads of said primary winding, a second current transformer suitably disposed to sense the amount of current flowing through one of the end leads of said secondary winding, a third current transformer suitably disposed to sense the amount of current flowing through the other of the end leads of said secondary winding, a thermocouple embedded within the structure of said primary and secondary windings, switching means connected in one of the leads of said primary winding for opening and closing the primary winding circuit, said switching means including means for activating the switching means by signals originated from outside of the transformer enclosure, and protective means connected in one of the leads of said primary winding to limit the current which may flow through said primary winding.

8. A transformer monitoring system comprising a transformer, means for sensing information about currents in primary and secondary windings of said transformer, means for sensing information about the temperature of said primary and secondary windings, switching means for de-energizing said transformer by disconnecting said primary winding from an energizing voltage, means for transferring the sensed information to a remote monitor, identification means for identifying the sensed information as being sensed at said transformer, said remote monitor including means which processes the sensed information and which originates a signal to activate said switching means when the sensed information corresponds to a predetermined program.

9. The transformer monitoring system of claim 8 wherein the means which processes the sensed information comprises means for determining when current in the secondary winding exceeds a predetermined value, and means for determining when the ratio of the currents in the primary and the secondary windings does not correspond to the turns ratio of the primary and the secondary windings.

10. A transformer monitoring system comprising at least one transformer, said transformer including an enclosure, a primary winding having two leads, a magnetic core, a secondary winding having two end leads and a tap lead, a first current transformer suitably disposed to sense information about the amount of current flowing through one of the leads of said primary winding, a second current transformer suitably disposed to sense information about the amount of current flowing through one of the end leads of said secondary winding, a third current transformer suitably disposed to sense information about the amount of current flowing through the other of the end leads of said secondary winding, temperature sensing means which senses information about the temperature of said primary and secondary windings, switching means connected in one of the leads of said primary winding, said switching means being controllable from a remote monitor, means for transferring the sensed information to said remote monitor identification means for identifying the sensed information as being sensed at said transformer, said remote monitoring station including means for processing the sensed information to determine when current in said secondary winding exceeds a predetermined value, means for processing the sensed information to determine when the ratio of the currents in said primary and secondary windings does not correspond to the turns ratio of said primary and secondary windings, means for processing the sensed information to determine when the temperature of said primary and secondary windings exceeds a predetermined value, and means for activating a disconnect signal to open said switching means when the sensed information corresponds to a predetermined program.

* * * * *